Sept. 26, 1939.     H. J. VERNICK     2,173,988
TEA AND COFFEE DISPENSER
Filed Aug. 17, 1938

INVENTOR
H.J. VERNICK.
BY

Patented Sept. 26, 1939

2,173,988

UNITED STATES PATENT OFFICE 2,173,988

TEA AND COFFEE DISPENSER

Herman Joseph Vernick, Ferris, Ontario, Canada

Application August 17, 1938, Serial No. 225,410

3 Claims. (Cl. 221—112)

My invention relates to improvements in tea and coffee dispensers, and the object of the invention is to devise a dispenser of this type which may be operated by the hand which holds the dispenser, and it consists of a container, a discharge spout, a handle for the container, an operating lever pivoted to the handle in such a position that it is grasped by the hand grasping the handle, a cut-off plate for the upper end of the spout, a spout closure for the lower end, and means operated by the lever when subjected to grasping pressure for operating the cut-off to close the upper end of the spout and the closure to open the lower end of the spout as hereinafter more particularly explained by the following specification.

In the drawing like letters of reference indicate corresponding parts in the different views.

Figure 1:
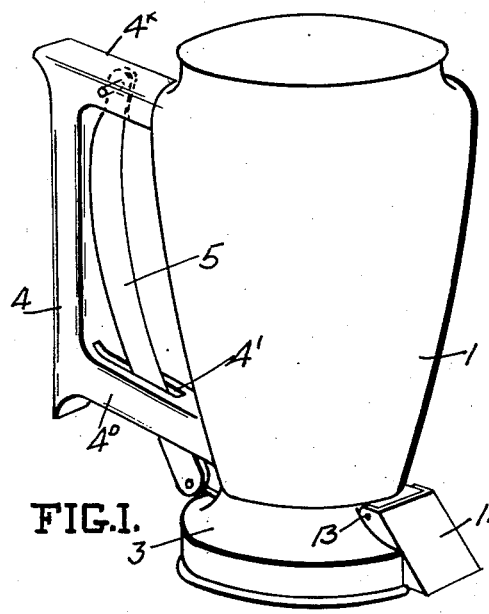
Fig. 1 is a perspective view of my dispenser.

Referring to Figs. 1 to 5 inclusive:

1 is the body of the container provided with a bottom wall 2 carried on a circular support 3 formed integral therewith. 4 is the handle provided with upper and lower horizontal arms 4$^x$ and 4$^0$. 4' is a slot in the arm 4$^0$. 5 is a lever pivoted at its upper end to the arm 4$^x$ and extending at its lower end through the slot 4'.

6 is an arm extending from the support 3 and in which and the bottom 2 is journalled a pin 7 to which is secured the quadrant plate 8 having a concentric slot 9. 10 is a tension spring connecting the small end of the plate 8 to the support 3. 11 is a spout extending from the bottom wall 2 and from the opening 2$^x$ thereof and through the supporting wall 3.

Figures 4, 5:
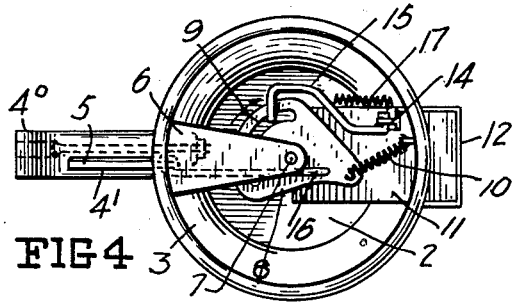
Fig. 4 is an inverted plan view of the dispenser.
Fig. 5 is a detail showing the connection between the quadrant plate and link.

12 is a spout closure pivoted to the spout at 13. The spout closure 12 is provided with a lug 14. 15 is a link pivoted to the lug 14 and having a hooked end 15$^x$ engaging the slot 9 as illustrated in Fig. 5. 16 is a link connecting the quadrant plate 8 to the lever 5. 17 is a tension spring connecting the lug 14 to the bottom wall 2. 17$^x$ is a cut-off plate secured to the pin 7 and having an opening 17$^0$ registering with the opening of the bottom wall 2.

When the hand of the operator grasps the handle 4 with fingers extending around the lever 5 and his grasp is tightened, such lever is swung towards the handle pulling the link 16 in the same direction. The pull on the link 16 swings the plate 8 in the direction of arrow 10 against the tension of the spring 10 turning the pin 7 so that its curved end disturbs the contents of the container to fill the spout 11. The turning of the pin 7 rotates the cut-off plate 17$^x$ to close the opening 2$^x$. Towards the end of the movement of the quadrant plate and after the closing of the orifice 2$^x$ by the cut-off 17 the end of the slot 9 strikes the end of the link 15 so as to swing the cover 12 upward to the open position against the tension of the spring 20 17 allowing the contents of the spout below the cut-off plate to discharge a measured quantity of the container contents.

Figure 6:
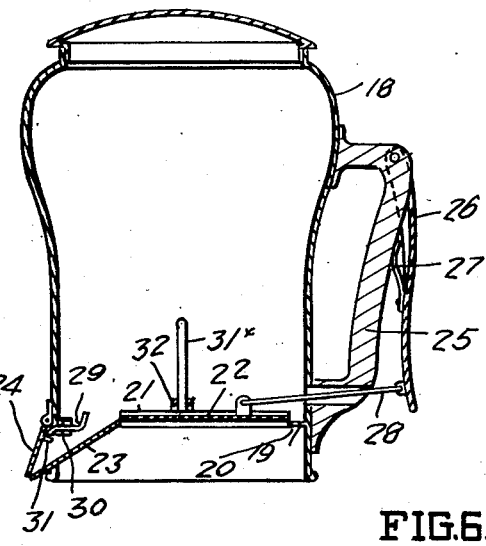
Fig. 6 is a sectional view showing a modified form.
Figure 2:
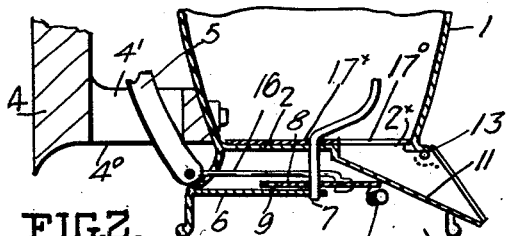
Fig. 2 is a sectional view taken through the spout.
Figure 7:
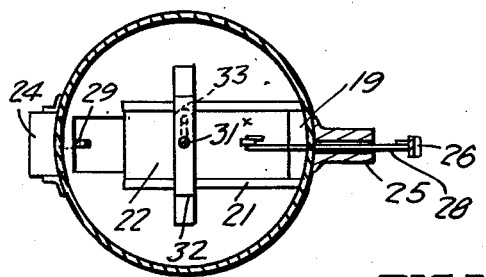
Fig. 7 is a sectional plan view on line 7—7 Fig. 6.
Figure 3:
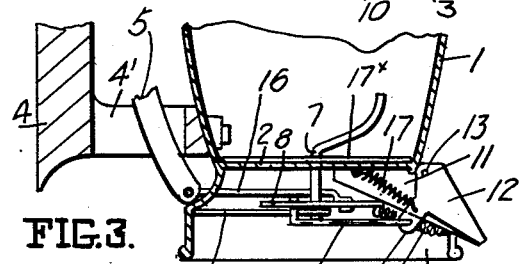
Fig. 3 is a sectional view taken at one side of the spout.
Figure 8:
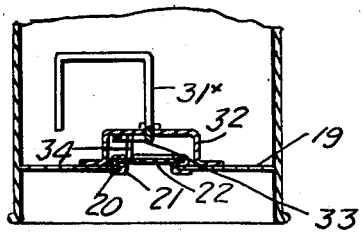
Fig. 8 is a sectional view through the lower portion of the container and at right angles to the section shown in Fig. 5.

Referring to Figs. 6 to 8.

18 is a container provided with a bottom wall 19 having a diametric slot 20 in which is secured a slide-way 21 for a sliding cut-off plate 22. 23 is the spout of the container extending from the open end of the slot 20. 24 is a pivoted closure for the spout 23. 25 is the handle of the container to which is pivoted a lever 26 spring pressed outward by the spring 27. 28 is a link connecting the lever 26 with the sliding cut-off plate 22.

29 is a slide piece slidable in the slide-way 30 and bearing at one end against the projection 31 extending inward from the closure 24. 31$^x$ is an agitator pivoted on a bridge member 32 and provided with a slotted arm 33 into which extends a pin 34 carried by the sliding cut-off plate 22.

When the handle 25 is grasped and the lever 26 pressed inward by the fingers of the grasping hand extending therearound, the sliding cut-off plate 22 is moved to the closed position against the slide-way 30 to cut off the contents of the container from the spout 23. The end of the sliding closure 22, as it is carried to the closed position, engages the slide piece 29 forcing it forward to raise the spout closure 24 and allow the contents of the spout to discharge.

From this description it will be seen that I have devised a dispenser which may be operated by the hand holding the container to measure predetermined quantities of the contents of the container.

What I claim as my invention is:

1. A dispenser for loose material such as tea, coffee and the like comprising a container, a pin journalled centrally in the container bottom, a handle for the container, a lever pivoted to the top of the handle and depending towards the bottom of the container, a spring held quadrant secured to the central pin having a concentric slot therein, a spring held hinged closure for the lower end of the spout, a link pivoted to the closure at one end and extending upward through the slot at the opposite end, a cut-off plate also secured to the pin, and a link extending inward from the lever and pivoted thereto at one end and to the quadrant at the opposite end.

2. A dispenser for loose material such as tea, coffee and the like comprising a container having a discharge orifice in the bottom wall thereof, an inclined spout extending radially from the discharge orifice at one side of the container body, a cover for the spout hingedly mounted thereon adjacent to the container, a loop handle for the container forming a hand grip, a lever pivoted to the handle at its upper end and extending below the hand grip at its lower end, means for closing the upper end of the spout, means extending between the lower end of the lever and the closing means for operating the same, and means for operating the hinged cover to open by the operation of the closing means.

3. A dispenser for loose material such as tea, coffee and the like comprising a container, a handle for the container, a lever pivoted to the top of the handle and depending adjacent to the bottom of the container, a spring held member pivotally mounted adjacent the container bottom and having a slot therein, a springheld hinged closure for the lower end of the spout, a member coacting at one end with the closure and with the slot at the opposite end, a cut-off plate also mounted on the container bottom concentrically with the slotted member, and a link extending inwardly from the lever and pivoted thereto at one end and to the slotted member at the opposite end.

HERMAN JOSEPH VERNICK.